United States Patent [19]

Maruyama

[11] Patent Number: 5,041,927

[45] Date of Patent: Aug. 20, 1991

[54] MAGNETIC DISC DRIVING APPARATUS HAVING SPEED AND POSITION CONTROL

[75] Inventor: Takafumi Maruyama, Amagasaki, Japan

[73] Assignee: Mitsubishi Denki Kabushiki Kaisha, Tokyo, Japan

[21] Appl. No.: 325,648

[22] Filed: Mar. 20, 1989

[30] Foreign Application Priority Data

May 26, 1988 [JP] Japan .................................. 63-130571

[51] Int. Cl.$^5$ .............................................. G11B 5/55
[52] U.S. Cl. .............................. 360/78.04; 360/77.02
[58] Field of Search ............ 369/32; 360/77.02, 78.04, 360/78.05, 78.06

[56] References Cited

U.S. PATENT DOCUMENTS

| | | | |
|---|---|---|---|
| 4,710,865 | 12/1987 | Higomura | 364/157 X |
| 4,811,133 | 3/1989 | Nakadai et al. | 318/592 X |
| 4,845,698 | 7/1989 | Baas | 369/32 |

FOREIGN PATENT DOCUMENTS

| | | | |
|---|---|---|---|
| 0249020 | 12/1987 | European Pat. Off. | 318/561 |
| 0260138 | 3/1988 | European Pat. Off. | 318/466 |
| 2529423 | 12/1983 | France | 369/44 |
| 2062901 | 5/1981 | United Kingdom | 369/44 |

OTHER PUBLICATIONS

R. K. Oswald, Head Positioning Servo Design for the IBM 3344/3350 Disk Files, IEEE Transactions on Magnetics, vol. MAG-14, No. 4, Jul. 1978, pp. 176-177.
Mitsubishi Denkigiho, vol. 59, No. 12, 1985, pp. 11-15.

*Primary Examiner*—Vincent P. Canney
*Assistant Examiner*—David L. Robertson
*Attorney, Agent, or Firm*—Wolf, Greenfield & Sacks

[57] ABSTRACT

A magnetic disc driving apparatus for positioning a magnetic head by a servomechanism, which, when control mode of positioning control is switched from speed control to tracking control, switches the tracking control to open-loop control by an optimum compensation quantity at the position and speed of the magnetic head and holds open-loop control for a predetermined time, and which, after the lapse of predetermined time, returns the tracking control to closed-loop control, thereby restricting overshoot of the magnetic head caused during the tracking control and reducing a settling time.

8 Claims, 3 Drawing Sheets

MAGNETIC DISC DRIVING APPARATUS HAVING SPEED AND POSITION CONTROL

BACKGROUND OF THE INVENTION

1. Field of the Invention

The present invention relates to a magnetic disc driving apparatus, and more particularly to a magnetic disc driving apparatus carrying out tracking control for its magnetic head in combination with open-loop control and closed-loop control.

2. Description of the Prior Art

FIG. 1 is a block diagram of a conventional magnetic head positioning control system disclosed in, for example, the "Mitsubishi Denkigiho" (Vol. 59, NO.12, 1985, p.14), in which reference 1 designates a speed error detector for detecting an error in the seek speed of a magnetic head, and an output signal B from the speed error detector 1 and an output signal C from a compensator 2 for stabilizing tracking control of the magnetic head are inputted to a control mode switch 3 for switching a control mode to be described below, the control mode switch 3 receiving a control signal D therefor and outputting an output signal E to an actuator (not shown) for the magnetic head.

FIG. 2 is a block diagram of the conventional compensator, in which a compensator 2 comprises a first compensating unit 21 for integrating an input signal A and a second compensating unit 22 for proportionally amplifying the integrated signal.

Next, an operation of the conventional disc driving apparatus will be explained. A seek instruction from a central processing unit, such as a personal computer, starts access of a magnetic head to a target track at a magnetic disc, at which time the head positioning control system is switched by the control mode switch 3 to a mode for controlling the seek speed of the magnetic head called the speed control mode, on the basis of the control signal D. The control mode switch 3 selects the output signal B from the speed error detector 1 and outputs it as the output signal E. In this state, when the magnetic head reaches a preset position on the target track, the control signal D is inverted, the control mode switch 3 selecting the output signal C to output it as the output signal E. The control mode is switched from the speed control mode to the position control mode and, when switched thereto, the magnetic head is tracking-controlled to track the set position of target track at the magnetic disc. Table 1 shows operator of the control mode switch 3 when the control mode is switched. For example, when the control signal D is a level "L", the output signal E=B is obtained and when the same is at a level "H", the output signal E=C is obtained.

TABLE 1

| D | E |
|---|---|
| L | B |
| H | C |

The tracking control is always carried out under closed-loop control.

Since the tracking control of the conventional magnetic disc apparatus is carried out under closed-loop control, there is a fear that, when the control mode is switched, the position and speed of the magnetic head may cause the head to jump over the target track at the magnetic head position so as to cause overshoot. When overshoot occurs, it causes the problem that a settling time of the magnetic head becomes longer.

SUMMARY OF THE INVENTION

In order to solve the above problem, the present invention has been designed. An object thereof is to provide a magnetic disc driving apparatus which, when the control mode of the magnetic head is switch from the speed control mode to the position control mode, the position control is switched from a closed-loop to an open-loop for a predetermined time, and simultaneously an optimum compensation quantity at the position and speed at that time is inputted, thereby causing no overshoot of the magnetic head and enabling the settling time to be reduced. In order to attain the object, the magnetic disc driving apparatus of the invention is characterized in that loop switching means for switching closed-loop control and open-loop control, provided at compensating means aiming at stabilization of tracking control, is adapted to switch for a predetermined time the tracking control to open-loop control when the magnetic head is switched to the tracking control.

The above and further objects and features of the invention will more fully be apparent from the following detailed description with accompanying drawings.

DESCRIPTION OF THE PREFERRED EMBODIMENTS

Next, an embodiment of a magnetic disc driving apparatus of the invention will be described with reference to the drawings.

Figure 1:
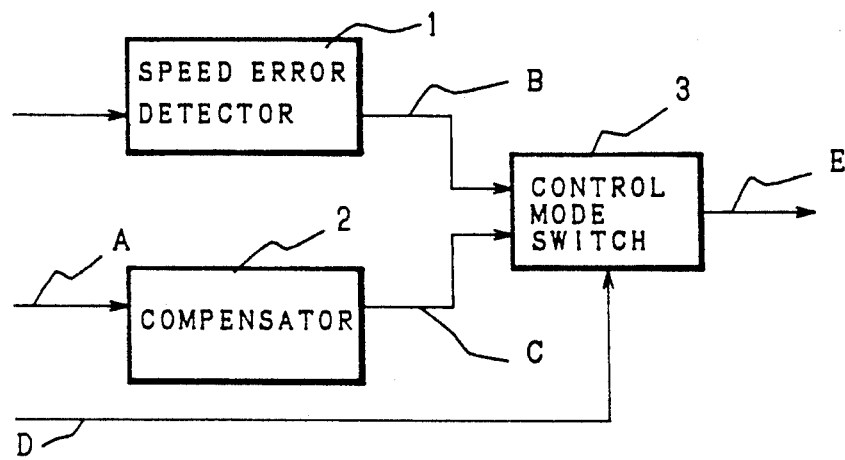
FIG. 1 is a block diagram of a positioning control system for a magnetic head at the conventional magnetic disc driving apparatus.
Figure 2:
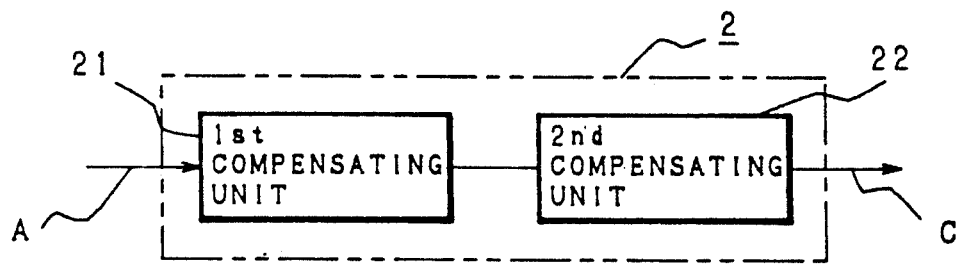
FIG. 2 is a block diagram of the conventional compensator.
Figure 3:
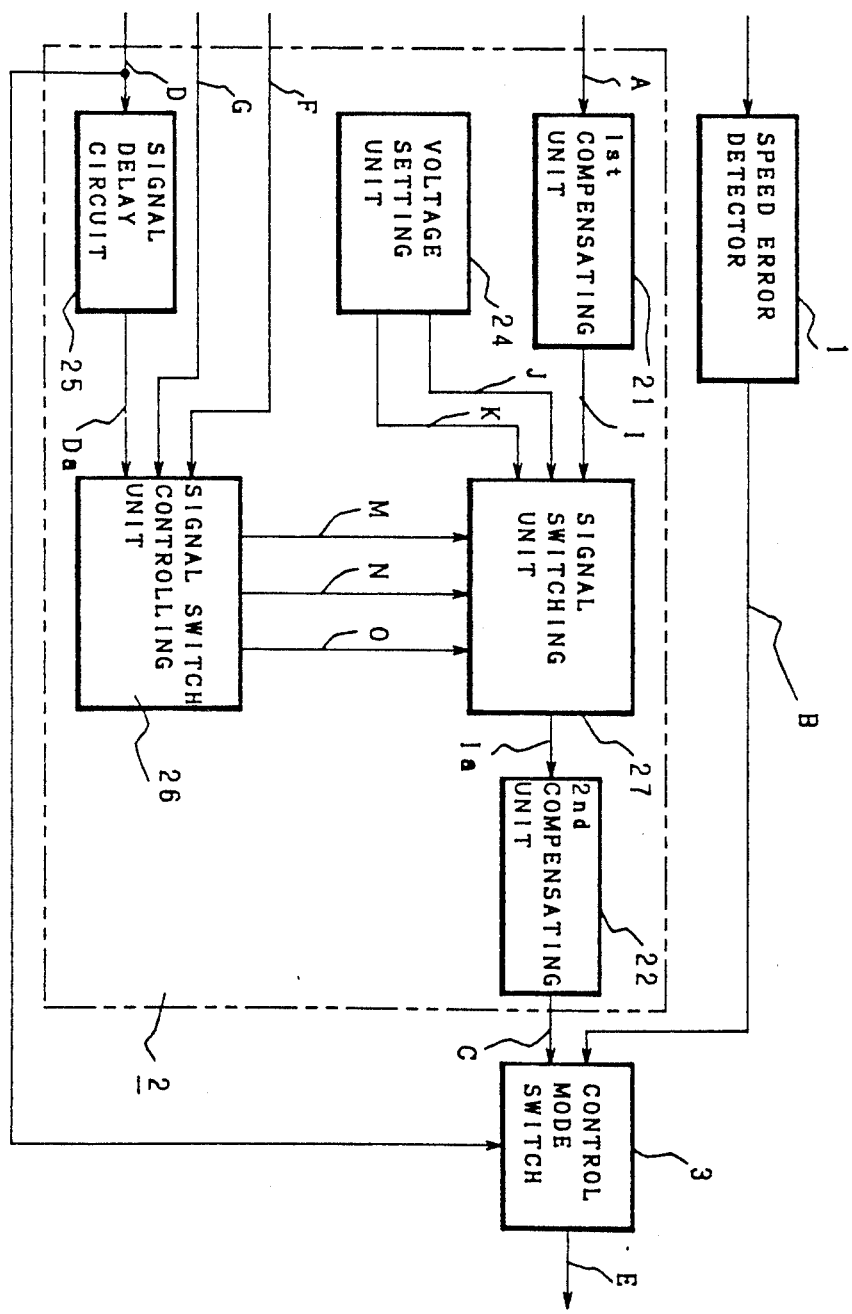
FIG. 3 is a block diagram of an embodiment of a magnetic disc driving apparatus of the invention.

FIG. 3 is a block diagram of a magnetic head positioning control system at a magnetic disc driving apparatus of the invention, in which reference numeral 1 designates a speed error detector for detecting an error in the seek speed of the magnetic head, so that an output signal B from the error detector and an output signal C from a compensator 2 for stabilizing the tracking control for the magnetic head are inputted to a control mode switch 3 for switching a control mode to be described below, the control mode switch 3 receiving a control signal D therefor and outputting an output signal E to an actuator (not shown) for the magnetic head.

The compensator 2 as compensating means for the tracking control comprises a first compensating unit 21 for integrating an input signal A, a voltage setting unit 24 for setting an optimum constant voltage during the tracking control switching, a signal switching unit 27 which receives an output signal I from the first compensating unit 21 and output signals J and K from the voltage setting unit 24 and which switches these signals, a second compensating unit 22 which receives an output signal Ia the signal switching unit 27 and proportionally amplifies the output signal Ia, a signal delay circuit 25 for delaying the control signal D for a predetermined time Td only, and a signal switch controlling unit 26 which receives a delay control signal Da outputted from the signal delay circuit 25 and signals F and G indicating the seek direction of the magnetic head, and outputs separate switching signals M, N and O on the basis of the signals Da and F and G in combination, to the signal switching unit 27.

The signals F and G, for example, when the signal F is at a level "H" and that G is at a level "L", indicate that the magnetic head seeks from the outer periphery of the magnetic disc toward the inner periphery thereof, and, when leveled vice versa, indicate the same seeks from the inner periphery toward the outer periphery. Further, the output signals J and K respectively output a value in different condition, so that when the output signal J is positive, the output signal K is negative and, vice versa, the output signal J being set voltage when the magnetic head seeks radially inwardly, the output signal K being set voltage when the magnetic head seeks radially outwardly.

Next, operation of the magnetic disc driving apparatus of the invention will be explained. The seek instruction from the central processing unit of the personal computer or the like, as the same as the conventional one, allows the magnetic head to start access to the target track at the magnetic disc, at which time the head positioning control system is switched on the control signal by the control mode switch 3 to the mode called the speed control mode, for controlling the seek speed of the magnetic head, so that the control mode switch 3 selects the output signal B of the speed error detector 1 and outputs the selected signal as the output signal E. In this state, when the magnetic head reaches the preset position of the target track, the control signal D is inverted. When the control signal D is inverted, the control mode switch 3 is switched to the position control mode, thereby performing the tracking control.

Then, the signal delay circuit 25 outputs the delay control signal Da inverted later by a predetermined time Td only. The signals F and G and delay control signal Da are inputted to the signal switch controlling unit 26 and the switching signals M, N and O are outputted therefrom. The logic of the switching signals M, N and O switches the output signal Ia of the signal switching unit 27 to one of the output signals I, J and K. An example of the logic is shown in Table 2, in which the levels "L" of switching signals M, N and O correspond separately to the output signals I, J and K. The output signal Ia of the signal switching unit 27 is amplified by the second compensating unit 22 so as to be the output signal C, which is inputted to the control mode switch 3 and the output signal E is outputted therefrom.

TABLE 2

| F | G | Da | M | N | O | Ia |
|---|---|----|----|----|----|----|
| H | L | L | L | H | H | I |
| L | H | L | L | H | H | I |
| H | L | H | H | L | H | J |
| L | H | H | H | H | L | K |

Figure 4:
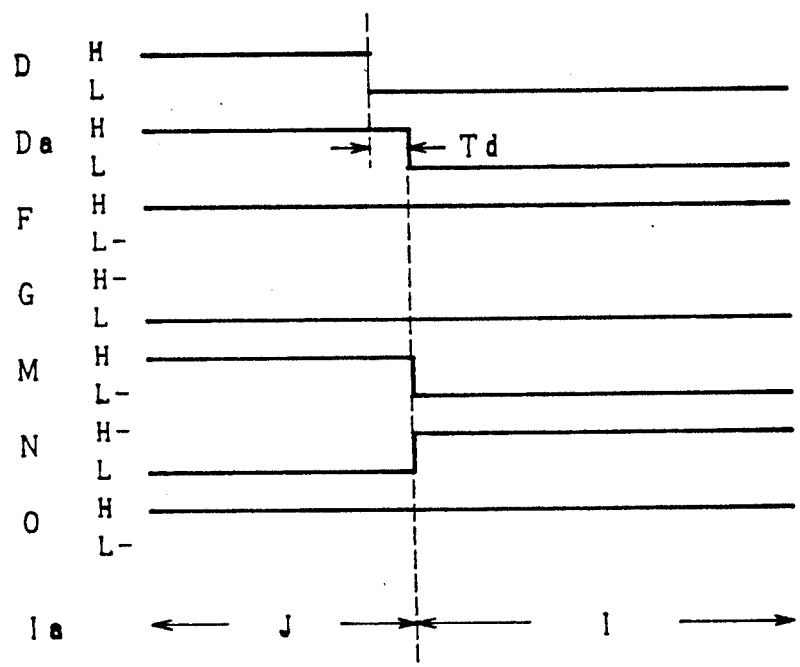
FIG. 4 is a time chart explanatory of operation for positioning control.

FIG. 4 is a timing chart of each signal when the magnetic head seeks radially inwardly, in which, when the control mode switch 3 is switched to the position control mode, the tracking control of compensator 2 disengages from the closed-loop, for the predetermined time Td, resulting in the set voltage of output signal J or K from the voltage setting unit 24 being coupled into the compensator 2 corresponding to the seeking direction of the magnetic head. In other words, the open-loop control system is formed for the predetermined time Td.

In addition, in the embodiment, the voltage setting unit is adapted to set constant voltage, but the present invention is not limited to the above, and alternatively, the voltage setting unit may set voltage variable with time.

Of course, the logic of signal switch may be constituted by inverting the "H" and "L" in Table 1.

Furthermore, in the embodiment, the switching signals M, N and O and output signals I, J and K are deemed respectively one set (M and I, N and J, and O and K), but the present invention is not limited to the above. When three kinds of output signals are issued, as shown in Table 3, they may be selected by two kinds of control signals.

TABLE 3

| Signal 1 | Signal 2 | Ia |
|----------|----------|----|
| L | L | I |
| L | H | I |
| H | L | J |
| H | H | K |

As seen from the above, the magnetic disc driving apparatus of the invention is so constructed that when the control mode of the head positioning control system is switched to the position control mode, the tracking control disengages from the control loop of the compensator for the predetermined time Td so that the compensator is given the optimum value corresponding to the seeking direction of the magnetic head due to the set voltage from the voltage setting unit, thereby adjusting the predetermined time and set voltage to enable the overshoot of the magnetic head to be restricted and the settling time thereof to be reduced.

While, an embodiment of the invention has been shown and described, the invention is not limited to the specific construction thereof, which is merely exemplary in the specification.

What is claimed is:

1. A magnetic disc driving apparatus comprising:
   a magnetic head positioned relative to a magnetic disc;
   magnetic head control means for positioning said magnetic head while seeking and tracking a target track of a magnetic disc;
   speed control means for controlling the seek speed of said magnetic head by closed-loop control;
   position control means, provided with compensating means for stabilizing the operation of the position control means when controlling the position of said magnetic head so as to track said target track; and
   control switching means for switching said magnetic head control means from control by said speed control means to control by said position control means, when said magnetic head has accessed said target track,
   said compensating means having switching means for switching said position control means from closed-loop control to open-loop control, at the time when said control switching means switches said magnetic head control means from control by said speed control means to control by said position control means, and holding said open-loop position control means for a predetermined time and thereafter switching said position control means back to said closed loop control.

2. A magnetic disc driving apparatus according to claim 1, wherein said open-loop position control means includes;

voltage setting means for setting a voltage corresponding to the seek direction of said magnetic head.

3. A magnetic disc driving apparatus according to claim 2, wherein said voltage setting means sets a voltage that is variable with time.

4. A magnetic disc driving apparatus having a magnetic head adapted to be position-controlled at a target track of a magnetic disc, and a magnetic head control system comprising;

speed control means for controlling the seek speed of said magnetic head, position control means including compensating means for controlling said magnetic head in position so as to track said target track, and control switching means for switching said magnetic head control means from operation by said speed control means to operation by said position control means, when said magnetic head has accessed said target track, said compensating means including switching means for switching said position control means from closed-loop control to open-loop control, holding said open-loop control for a predetermined time and thereafter switching said position control means to closed-loop control when said control switching means switches said position control means from said speed control means to said position control means.

5. The magnetic disc driving apparatus according to claim 4 including a voltage setting means employed during open-loop position control operation for setting a voltage corresponding to the seek direction of said magnetic head.

6. The magnetic disc driving apparatus according to claim 5 wherein said voltage setting means sets a voltage that is variable with time.

7. The magnetic disc driving apparatus according to claim 4 wherein said compensating means includes delay means for establishing said predetermined time.

8. In a magnetic disc driving apparatus, a method of controlling the magnetic head for position control thereof to seek and access a track of a magnetic disc, said method comprising the steps of, providing speed control operation and position control operation, said speed control operation for controlling the seek speed of the magnetic head, said position control operation for controlling the magnetic head in position so as to track a target track, switching the position control from closed-loop control to open-loop control, holding the open-loop control for a predetermined time and thereafter switching the position control operation to closed-loop control when switching from speed control operation to position control operation.

* * * * *